July 13, 1948.	R. B. COTTON ET AL	2,444,919
RELEASE COUPLING
Filed Jan. 4, 1945
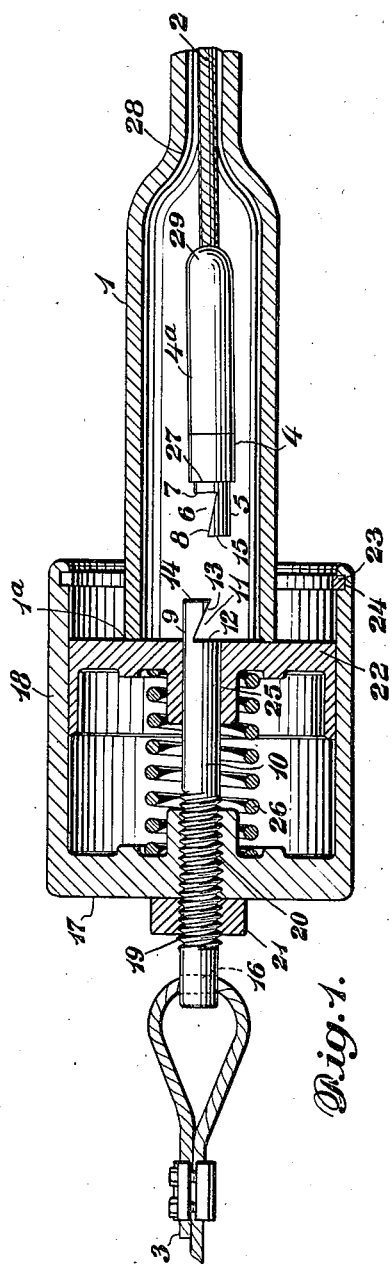
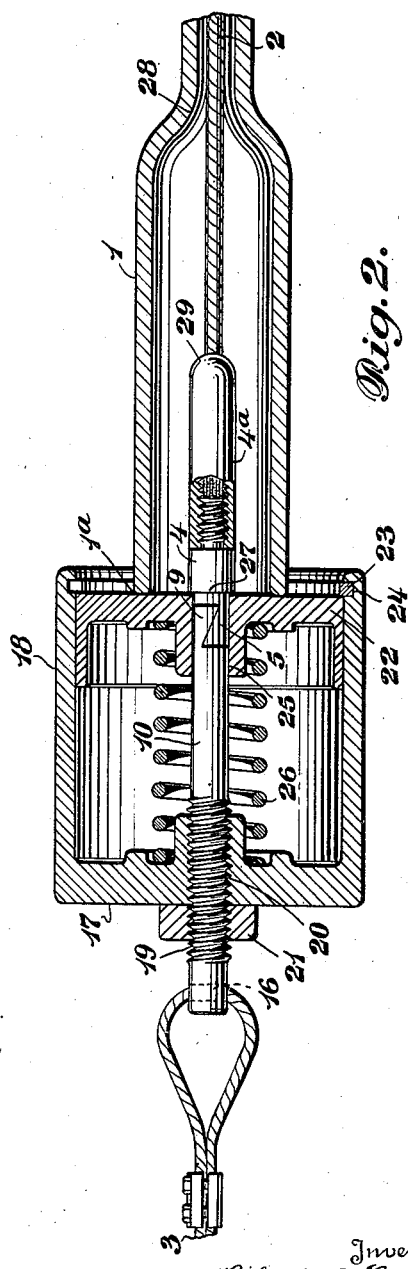
Inventors
Robert B Cotton,
Richard Joseph Ryan
and John Joseph Domoj
By
P. E. Bush
Attorney Patented July 13, 1948

2,444,919

UNITED STATES PATENT OFFICE 2,444,919

RELEASE COUPLING

Robert B. Cotton, Lansdowne, Pa., Richard Joseph Ryan, United States Marines, and John J. Domoj, United States Navy Application January 4, 1945, Serial No. 571,342

13 Claims. (Cl. 244—3)

(Granted under the act of March 3, 1883, as amended April 30, 1928; 370 O. G. 757)

The present invention relates to a releasable coupling connecting two lines or the like, and to means for releasing the coupling, and has for an object the provision of a novel and effective coupling of simple construction which is releasable upon engagement with a buffer while moving in relation thereto to release and separate the coupling and the two lines or line portions.

A further object is to provide such a releasable coupling which may be readily connected in forming the coupling between the two lines or the like.

Another object is the provision of releasing means for the coupling comprising a buffer sleeve or tube through which the line passes and with which the moving coupling forcibly engages.

Other objects and advantages of the invention will be apparent from the following description taken in connection with the accompanying drawings, which are exemplary and in which:

Fig. 1 is a sectional view showing the coupling in separated condition immediately following engagement with the buffer sleeve but prior to the return action of the spring which acts to assist in the disengagement of the coupling from its contact with the buffer sleeve. Fig. 2 shows the apparatus at the instant of engagement of the coupling with the buffer, and prior to the separating action.

The releasable coupling of the present invention is particularly suited for use in connection with glider towing and launching means, for example such as is described in the application of Robert B. Cotton, filed October 28, 1943, Serial No. 507,931, now Patent No. 2,432,508 of December 16, 1947, wherein a tow line and a take-up line are connected by a coupling releasable upon engagement with a stationary or fixed buffer sleeve through which the take-up line moves.

The invention however, is not limited to this use. Referring to the drawings, the numeral 1 designates a buffer sleeve or tubular member through which a line or the like 2 is passed, such as a take-up line like that referred to in the aforementioned application of Robert B. Cotton relating to a glider launching apparatus. The buffer sleeve may desirably be fixed upon the ground or other launching surface. According to the present invention the buffer comprises a simple tube or sleeve the end 1a of which serves as an abutment or buffer for the herein described releasable coupling.

A second line or the like 3 is designed for attachment to the line 2 by means of the releasable coupling. This second line may be a tow-line like that referred to in the said application of Robert B. Cotton.

The line 2 is provided with a rod member 4, connected thereto by connecting member 4a, said rod member 4 having a terminal jaw member 5 formed by a notch or recess 6 therein providing a face 7 which may desirably be normal to the axis of the rod member and a face 8 at an angle to said axis. A complementary terminal jaw member 9 is provided on a rod member 10 connected to the line 3. The jaw member 9 is formed by a notch or recess 11 therein providing a face 12 which may desirably be normal to the axis of the rod member 10, and an inclined face 13 complementary to the inclined face 8 of the jaw member 5 or rod 4. The faces 7 and 12 are complementary to the end faces 14 and 15, respectively, of the rod members 10 and 4, which faces may desirably be normal to the axes of the rods although they may be inclined thereto if desired.

The rod 10 is provided with an eye or the like 16 for attachment to the line or the like 3. The rod 10 extends centrally through the end 17 of a cylinder 18 which is secured to the rod 10 by any suitable means such as the threads 19 on the rod 10 engaging a threaded bore 20 in the end 17 of the cylinder. A lock nut or the like is provided as shown at 21.

A plate or plunger member 22 is received within the cylinder 18 and is retained therein and is limited in its outward movement, by a split snap or spring ring 23 received in an annular groove 24 in the cylinder and protruding therefrom. The plunger 22 has a central bore 25 therein and is slidable over the end of the rod 10. The plunger member when retracted serves as the releasing means on the coupling as will be described.

A shoulder may desirably be provided on the rod 4 as indicated at 27, which serves as a retaining means which will limit the outward movement of the plunger in forming the coupling as indicated in Fig. 2. The shoulder 27 may be omitted if desired, in view of the provision of the spring retaining ring 23.

The plunger or plate 22 is urged toward the open end of the cylinder by the spring 26 mounted between the end 17 of the cylinder and the plunger.

The parts are so disposed that when the plunger is in its advanced position, as seen in Fig. 2, the plunger bore receives and embraces the inter-engaged members or jaws 5 and 9 of the coupling and forms a secure coupling. The cylinder with its spring retaining ring is extended sufficiently beyond the end of the rod 10 so that the plate or plunger may embrace the inter-engaging jaws as well as portions of both rods 10 and 4 adjacent the jaws.

In the operation of the device, as indicated in Fig. 2, the coupling comprising the coupled members, and the attached lines or the like are moving with the line 2 passing into and through the buffer sleeve 1, and the coupling is about to engage the end of the buffer sleeve.

Upon the forcible engagement of the coupling with the end of the buffer sleeve, due to the velocity of the coupled lines, the plunger or impact plate 22 is depressed by the buffer sleeve end, as indicated in Fig. 1, against the action of the spring 26, until the inter-engaged surfaces of the jaws 5 and 9 are uncovered by the retracted plunger, whereupon the coupling is released by separation and disengagement of the jaws and rods, under the pull on the rod 4 which moves onward into the sleeve 1. At the same time the spring pressed plunger pushes against the end of the buffer sleeve and assists in the disengagement, so that the line or the like 3 with its attached cylinder and contents is pushed away from the buffer sleeve. The plunger then again assumes the position in the cylinder as indicated in Fig. 2 except that the line 2 and its jaw 5 are not present.

The rod 4 and its line 2 may desirably be stopped, after being pulled into the sleeve, by abutments 28 and 29 provided on the sleeve and on the rod 4 respectively.

To establish the coupling, the rod 4 is pulled forwardly out of the buffer sleeve 1 and its jaw 5 is forced against the plunger 22 adjacent the bore 25 and adjacent the end 14 of the jaw 9 until it can be dropped laterally into engagement with the jaw 9. The spring pressed plunger 22 will then advance and embrace the inter-engaged members to secure the coupling, as indicated in Fig. 2.

It will be apparent that the parts may be designed and constructed for release operation at any given velocity of the line or the like 2 moving into the fixed buffer.

Although but one embodiment of the invention is shown and described, it will be apparent that changes in the size, shape, and arrangement of parts may be made without departing from the spirit and scope of the invention as defined by the appended claims. It will be apparent also that device of the present invention may be used for various purposes, and that it is not to be limited to any particular use.

The invention described herein may be manufactured and used by or for the Government of the United States of America for governmental purposes without the payment of any royalties or therefor.

What is claimed is:

1. A coupling connecting two lines or the like, a buffer through which one of the lines passes, and means on said coupling to release it when the line is moved through the buffer so as to cause the coupling to strike the buffer, said coupling comprising members connected one to each line, one of said members including a cylinder, said releasing means on said coupling including a plunger slidably received in said cylinder, retaining means for said slidable plunger, and spring means disposed to urge said slidable plunger outwardly of said cylinder.

2. A coupling connecting two lines or the like, a buffer through which one of the lines passes, and means on said coupling to release it when the line is moved through the buffer so as to cause the coupling to strike the buffer, and resilient means in the coupling, said resilient means acting to separate a portion of said coupling from said buffer upon release.

3. A coupling connecting two lines or the like, a fixed buffer tube through which one of the lines passes, and means on said coupling to release it when the line is moved through the buffer tube so as to cause the coupling to strike the proximate end of the fixed buffer which actuates the releasing means on the coupling, said buffer tube having an abutment thereon adjacent its other end, and a member on said line to engage said abutment to limit passage of said member and line through said fixed buffer tube following release of the coupling.

4. A releasable coupling connecting two line portions or the like, comprising inter-engageable members connected one to each line portion, releasing means on the coupling comprising a plate having a bore receiving one of said members and slidable thereon, a cylinder receiving and secured on said member and slidably receiving said plate, spring means between said plate and cylinder urging said plate to overlie and embrace the inter-engaging members, and retaining means for limiting the movement of said slidable plate outwardly of said cylinder while permitting outward movement of the plate to overlie and embrace the interengaging members.

5. A releasable coupling connecting two line portions or the like, comprising inter-engageable members connected one to each line portion, releasing means on the coupling comprising a plate having a bore receiving one of said members and slidable thereon, a cylinder receiving and secured on said member and slidably receiving said plate, spring means between said plate and cylinder urging said plate to overlie and embrace the inter-engaging members, and retaining means on said cylinder for limiting the movement of said slidable plate outwardly of said cylinder while permitting outward movement of the plate to overlie and embrace the inter-engaging members.

6. A releasable coupling connecting two line portions or the like, comprising inter-engageable members connected one to each line portion, releasing means on the coupling comprising a plate having a bore receiving one of said members and slidable thereon, a cylinder receiving and secured on said member and slidably receiving said plate, spring means between said plate and cylinder urging said plate to overlie and embrace the inter-engaging members, and retaining means on said cylinder for limiting the movement of said slidable plate outwardly of said cylinder while permitting outward movement of the plate to overlie and embrace the inter-engaging members, said retaining means comprising a groove in the bore of the cylinder and a spring retaining ring in said groove and protruding therefrom to limit outward movement of said slidable plate.

7. A releasable coupling connecting two line portions or the like, comprising rods connected one to each line, each rod having a jaw for engaging the jaw of the other rod, releasing means on the coupling comprising a plate member having a bore receiving one of said rods and slidable thereon, a cylinder receiving and secured on said rod and slidably receiving said plate, spring means between said plate and cylinder urging said plate toward the jaw of said rod, and retaining means for limiting the movement of said slidable plate outwardly of said cylinder and rod, while permitting outward movement of the plate to overlie and embrace the inter-engaging jaws.

8. A releasable coupling connecting two line portions or the like, comprising rods connected one to each line, each rod having a jaw for engaging the jaw of the other rod, releasing means on the coupling comprising a plate member having a bore receiving one of said rods and slidable thereon, a cylinder receiving and secured on said rod and slidably receiving said plate, spring means between said plate and cylinder urging said plate toward the jaw of said rod, and retaining means on the cylinder for limiting the movement of said slidable plate outwardly of said cylinder and rod, said cylinder with its retaining means thereon extending beyond the end of the rod sufficiently to permit the slidable plate member to overlie and embrace the inter-engaging jaws and adjacent portions of the rods.

9. A releasable coupling connecting two line portions or the like, comprising rods connected one to each line, each rod having a jaw for engaging the jaw of the other rod, said jaws being formed by recesses in the rods providing a surface in each rod inclined to the axis of the rod and complementary to the inclined surface on the other rod, releasing means on the coupling comprising a plate member having a bore receiving one of said rods and slidable thereon, a cylinder receiving and secured on said rod and slidably receiving said plate, spring means between said plate and cylinder urging said plate toward the jaw of said rod, and retaining means for limiting the movement of said slidable plate outwardly of said cylinder and rod, while permitting outward movement of the plate to overlie and embrace the inter-engaging jaws.

10. A releasable coupling connecting two line portions or the like, comprising rods connected one to each line, each rod having a jaw for engaging the jaw of the other rod, said jaws being formed by recesses in the rods providing a surface in each rod inclined to the axis of the rod and complementary to the inclined surface on the other rod, and said jaws having other complementary surfaces disposed substantially transversely of the axis of the rods, releasing means on the coupling comprising a plate member having a bore receiving one of said rods and slidable thereon, a cylinder receiving and secured on said rod and slidably receiving said plate, spring means between said plate and cylinder urging said plate toward the jaw of said rod, and retaining means for limiting the movement of said slidable plate outwardly of said cylinder and rod, while permitting outward movement of the plate to overlie and embrace the inter-engaging jaws.

11. A releasable coupling connecting two line portions or the like, comprising inter-engageable members connected one to each line portion, releasing means on the coupling comprising a plate having a bore receiving one of said members and slidable thereon, a cylinder receiving and secured on said member and slidably receiving said plate, spring means between said plate and cylinder urging said plate to overlie and embrace the inter-engaging members, and retaining means for limiting the movement of said slidable plate outwardly of said cylinder while permitting outward movement of the plate to overlie and embrace the interengaged members, said retaining means comprising a shoulder on the other of said members in rear of its jaw, for engaging the said slidable plate.

12. A coupling connecting two lines or the like, a buffer through which one of the lines passes, and means on said coupling to release it when the line is moved through the buffer so as to cause the coupling to strike the buffer, and resilient means in the coupling, said resilient means engaging said release means and acting to separate a portion of said coupling from said buffer upon release of the coupling.

13. A coupling connecting two lines or the like, a buffer through which one of the lines passes, and means on said coupling to release it when the line is moved through the buffer so as to cause the coupling to strike the buffer, said coupling comprising inter-engaging members connected one to each line, a cylinder surrounding and mounted on one of said members, said releasing means including a plunger slidably received on said member and in said cylinder, retaining means for said slidable plunger, and spring means disposed to urge said slidable plunger outwardly of said cylinder to embrace said inter-engaging members.

ROBERT B. COTTON.
RICHARD JOSEPH RYAN.
JOHN J. DOMOJ.

REFERENCES CITED

The following references are of record in the file of this patent:

UNITED STATES PATENTS

| Number | Name | Date |
|---|---|---|
| 867,312 | Schutz | Oct. 1, 1907 |
| 1,719,144 | Stokes | July 2, 1929 |
| 1,729,029 | Castro | Sept. 24, 1929 |
| 1,752,010 | Lamkey | Mar. 25, 1930 |
| 2,111,303 | Switlik | Mar. 15, 1938 |

FOREIGN PATENTS

| Number | Country | Date |
|---|---|---|
| 316,583 | Germany | Nov. 29, 1919 |